(12) United States Patent
Barcus et al.

(10) Patent No.: US 7,754,814 B2
(45) Date of Patent: Jul. 13, 2010

(54) POLYPROPYLENE MATERIALS AND METHOD OF PREPARING POLYPROPYLENE MATERIALS

(75) Inventors: Carolyn Barcus, Houston, TX (US); Mike Musgrave, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 669 days.

(21) Appl. No.: 11/129,940

(22) Filed: May 16, 2005

(65) Prior Publication Data

US 2006/0258811 A1 Nov. 16, 2006

(51) Int. Cl.
*C08L 23/00* (2006.01)
*C08L 23/04* (2006.01)
*B32B 7/12* (2006.01)
*B32B 15/04* (2006.01)

(52) U.S. Cl. .................. 525/191; 525/240; 428/343
(58) Field of Classification Search .................. 525/191, 525/240; 428/343
See application file for complete search history.

(56) References Cited

U.S. PATENT DOCUMENTS

| 4,473,687 A | 9/1984 | Dorrer et al. |
| 5,045,598 A | 9/1991 | Duez et al. |
| 5,912,292 A | 6/1999 | Sun |
| 6,153,703 A | 11/2000 | Lustiger et al. |
| 6,284,833 B1 | 9/2001 | Ford et al. |
| 6,342,565 B1 | 1/2002 | Cheng et al. |
| 6,881,793 B2 * | 4/2005 | Sheldon et al. ............. 525/240 |
| 7,217,767 B2 * | 5/2007 | Aguirre et al. ............. 525/191 |

OTHER PUBLICATIONS

S.J. Mahajan, B.L. Deopura and Yimin Wang, Structure and Properties of Drawn Tapes of High-Density Polyethylene/Ethylene-Propylene Copolymer Blends, Journal of Applies Polymer Science, vol. 60, 1996, pp. 1527-1538.

* cited by examiner

*Primary Examiner*—Nathan M Nutter
(74) *Attorney, Agent, or Firm*—Tenley R. Krueger; Diane L. Kilpatrick-Lee

(57) ABSTRACT

A polypropylene material is prepared from a blend of polypropylene impact copolymer and high crystallinity polypropylene having less than 2 percent xylene solubles. The material is prepared by blending the polymers while they are in a molten state, and forming a film or sheet from the polymer blend. The material has particular application to forming slit film tapes and similar materials. The resultant materials exhibit increased tenacity, elongation and toughness and less shrinkage as compared to those materials prepared solely from propylene homopolymers. The materials also have a better overall balance of physical properties than other blends for certain applications.

7 Claims, 5 Drawing Sheets

US 7,754,814 B2

POLYPROPYLENE MATERIALS AND METHOD OF PREPARING POLYPROPYLENE MATERIALS

TECHNICAL FIELD

The invention relates generally to materials prepared from polypropylene, and more particularly, to films and similar materials prepared from polypropylene blends, such as blends of high crystallinity polypropylene (HCPP) and polypropylene impact copolymer (ICP).

BACKGROUND

Polypropylene can be used in the manufacture of a variety of materials. In particular, polypropylene has been found useful in forming films and similar materials having a small or reduced thickness. One such material includes slit film tapes, which are used for a variety of applications. Common applications for polypropylene slit film tapes include carpet backing; industrial-type bags, sacks, or wraps; ropes or cordage; artificial grass and geotextiles. They can be particularly useful in woven materials or fabrics that require a high degree of durability and toughness. It is beneficial if the slit film tape can process easily and be resistant to breakage during all phases of the life of the tape, including manufacturing, weaving, and in the final fabric. Manufacturing of polypropylene slit film tapes is an extrusion process well known in the art, and inferior processability and strength can result in reduced extrusion efficiencies. Slit film tapes that break during weaving result in reduced loom efficiencies as well as a higher level of fabric defects.

Polypropylene slit film tapes are typically prepared from semi-crystalline, propylene homopolymers. These homopolymers are generally isotactic polymers prepared from stereospecific catalysts, such as Ziegler-Natta catalysts, which are well known in the art. While such polymers have provided polypropylene tapes with acceptable properties in the past, improvements in physical properties such as tenacity, toughness, elongation and reduced shrinkage are desirable.

SUMMARY OF THE INVENTION

In one aspect, the invention is a polypropylene material including a film or sheet of a melt blended polypropylene impact copolymer and a high crystallinity polypropylene having less than about 2 percent xylene extractables.

In another aspect, the invention is polypropylene tape including a melt blended polypropylene impact copolymer and high crystallinity polypropylene having less than about 2 percent xylenes solubles, the polypropylene impact copolymer being present in an amount of less than 80 percent by total weight of polymer blend and having an ethylene-propylene rubber phase in an amount of from about 5 percent or more by weight of copolymer.

In still another embodiment, the invention is an article comprising a material formed from a melt blend of a polypropylene impact copolymer and high crystallinity polypropylene having a xylene solubles content of less than about 2 percent.

A polypropylene article is also provided that includes a plurality of polypropylene slit film tapes that are interlaced or woven together and wherein the slit film tapes are each formed from a blend of a heterophasic propylene copolymer and an high crystallinity propylene homopolymer. The copolymer and homopolymer may be blended together in a molten state, extruded and formed into a length of tape. The polypropylene article may include a textile material, such as carpet backing.

BRIEF DESCRIPTION OF THE DRAWINGS

For a more complete understanding of the invention, and the advantages thereof, reference is now made to the following descriptions taken in conjunction with the accompanying figures, in which.

DETAILED DESCRIPTION

Figure 1:
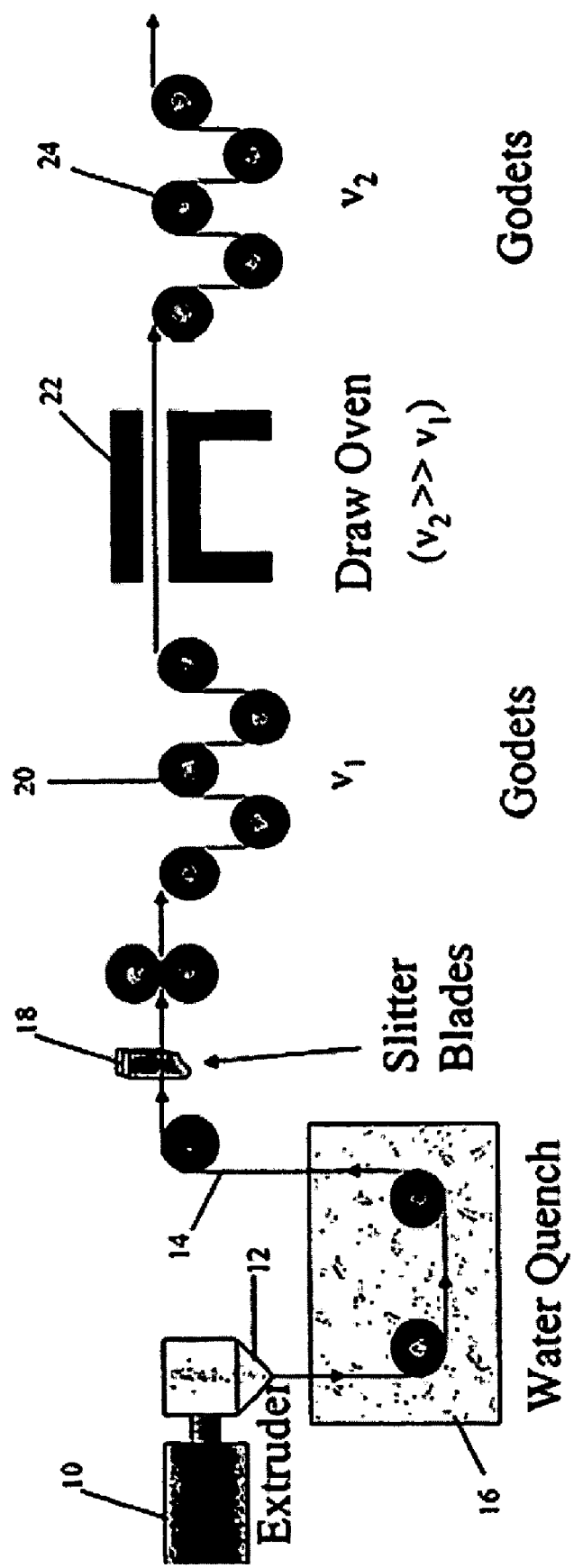
FIG. 1 is schematic diagram of a slit film tape line.

Propylene impact copolymers (ICP) are typically used in various molded articles, such as those formed through injection molding, requiring high impact strength. These polymers, although particularly well suited for such molded articles, have not been widely used in the manufacture of films or sheet-like material. It has been found, however, that by combining such impact copolymers as a blend with a high crystallinity polypropylene, improvements in such materials can be achieved, particularly with respect to slit film tapes.

The ICP polymers used in the present invention are heterophasic copolymers of propylene and ethylene. These polymers are typically made up of three components. These include a semi-crystalline polypropylene homopolymer, a rubbery ethylene-rich ethylene-propylene copolymer and a semi-crystalline ethylene-propylene copolymer. The typical heterophasic morphology of the ICP consists of generally spherical domains of rubbery ethylene-propylene copolymer dispersed within the semi-crystalline propylene homopolymer matrix. The amount and properties of the components are controlled by the process conditions and the physical properties of the resulting material are correlated to the nature and amount of the three components. The ICP polymers may have a room temperature notched IZOD impact strength of from about 2 to about 6 ft-lb/in, as measured by ASTM D-256. Unless otherwise specified, all notched IZOD impact strength is measured according to ASTM D-256.

The polymerization reaction used to produce such impact copolymers is often carried out in a two-reactor configuration in which a catalyst and propylene are introduced into a first reactor in which the propylene homopolymer is produced. The propylene homopolymer is then transferred to one or more secondary reactors where ethylene monomer is added to produce the ethylene-propylene rubber component of the polymer.

The polypropylene heterophasic copolymers may be those prepared by copolymerizing propylene with ethylene in the amounts of from about 80 to about 95% by weight of propylene and from about 5 to about 20% by weight ethylene. Examples of catalysts used to produce these copolymers may include Ziegler-Natta and metallocene catalysts commonly employed in the polymerization of polypropylene. The polypropylene copolymer may be prepared using a controlled morphology catalyst that produces ethylene-propylene copolymer spherical domains dispersed in a semi-crystalline polypropylene matrix. In the present invention, the amount of ethylene in the ICP may be from about 7 to about 15% by weight. Typical melt flow rates (MFR) for the heterophasic copolymer resins used are from about 2 g/10 min to about 8 g/10 min. Unless otherwise stated all melt flow rates presented are measured according to ASTM D-1238, Condition L. An example of a suitable commercially available heterophasic copolymer is that marketed as ATOFINA 4320, available from Total Petrochemicals, Inc., Houston, Tex.

Although not necessarily required, the polypropylene heterophasic copolymer fluff or powder can be modified to improve the copolymer's impact strength characteristics and other properties. This can be done through the use of elastomeric modifiers, or with peroxides, using controlled rheology techniques. When using elastomeric modifiers, the elastomeric modifiers are melt blended with the polypropylene copolymer, which facilitates improvements in the energy-absorption behavior of the ICP, contributing to higher impact strength. Examples of elastomeric modifiers include ethylene propylene rubber (EPR) and ethylene propylene diene monomer (EPDM) resins.

Controlled rheology techniques, commonly known in the art, are used to modify the EPR morphology to enhance impact strength. This technique uses peroxides or other suitable oxidizing agents.

Additionally, other additives, such as stabilizers, antioxidants, nucleating additives, acid neutralizers, anti-static agents, lubricants, filler materials, etc., which are well known to those skilled in the art, may also be combined with the propylene copolymer within the extruder.

The heterophasic propylene copolymer used in the present invention will typically have an ethylene-propylene rubber or EPR phase of from about 5% or more by weight of copolymer. A EPR content range may be from about 5% to about 50% by weight of copolymer, with from about 7% to about 20% by weight or copolymer being typical, and from about 10% to about 15% by weight of copolymer being more typical.

The propylene homopolymer used for the present invention is a high crystallinity polypropylene (HCPP). The polypropylene may be prepared from conventional stereospecific catalysts used for preparing HCPP, such as Ziegler-Natta or metallocene catalysts. The HCPP will typically have a melt flow rate of from about 2 g/10 min to about 8 g/10 min. The HCPP may include small amounts of comonomer, such as the $C_2$ to $C_8$ olefins. Such comonomer content may make up less than 1% by weight of the polymer, less than 0.5% by weight of the polymer, or less than 0.1% by weight of polymer.

The high crystallinity of propylene homopolymer results from a high degree of stereoregularity. These polymers also have low levels of xylene insolubles. For example, the xylene solubles is less than 2 percent by weight. In some embodiments, it is less than 1.5 percent by weight. In other embodiments the HCPP will have a xylene solubles content of from about 1 to about 1.5 percent.

In preparing the materials of the invention, both the ICP and HCPP can be blended together in a molten state. The amount of ICP used with the HCPP may be from about 5% to about 90% by total weight of polymer. The ICP may be used in an amount of less than 80% by total weight of polymer, or may be less than 70% by total weight of polymer, with the HCPP making up greater than 20% or 30% by total weight of polymer, respectively. The ICP content may include ranges of from about 20% to about 80% by total weight of polymer, or from about 30% to about 70% by total weight of polymer. The ICP can also be used in an amount of from about 40% to about 60% by total weight of polymer. The ICP and HCPP may be mixed together in pelletized, fluff or powder form prior to being introduced into an extruder. In certain instances, the polymers may be dry blended together prior to being introduced into the extruder. Alternatively, the polymers may be introduced separately into the extruder at a position to achieve thorough mixing of the polymers within the extruder, such as with a gravimetric or volumetric blender, which are commonly known in the art. The melt flow rate of the resulting polymer will typically be from about 0.5 g/10 min to about 15 g/10 min, with from 3 g/10 min to about 5 g/10 min being more typical. For some specific embodiments, such as use in strapping tape and netting, the melt flow rate may be about 0.5 to about 2 g/10 minutes. For monofilament line, the melt flow rate may be from about 2 to about 10 g/10 minutes.

Additives or processing aids may be combined with the polymers as well during this extrusion process. Typical additives for films and sheet-like materials, such as slit film tapes, which are well known to those skilled in the art, include UV stabilizers, antioxidants, antistatic agents, stearates, calcium carbonate, coloring additives, fluoropolymers and polyethylene.

Although the polypropylene material may be used in forming different film or sheet-like materials having a generally small or reduced thickness, the polymers have particular application to slit film tapes. Accordingly, the following description is with reference to such tapes. It should be apparent to those skilled in the art, however, that the invention is not limited to such tapes, but would apply to the same or similar materials where similar properties are desired.

Referring to FIG. 1, which schematically illustrates one example of a slit film line, the polymers, as well as any additives, are melt blended within an extruder 10 and passed through a die 12 to form a layer of film 14. Alternatively, the blended polymer may be formed into pellets for use at a later time. For slit film tape applications the film die will typically have a die opening of from about 10 to 30 mils to form a film of similar thickness. Upon extrusion through the die, the film is typically quenched in a water bath 16 (typically about 70 to 100° F.) or otherwise cooled, such as by the use of cooling rollers (not shown).

After quenching, the film is slit longitudinally into one or more tape segments or slit film tapes. This is usually accomplished through the use of a slitter 18 consisting of a plurality of blades spaced laterally apart at generally equal distances. The tapes are typically slit into widths of from about 0.25 to about 2 inches, more usually from about 0.5 to about 1 inch, but may vary depending upon the application for which the tapes will be used.

The slit film tapes are then drawn or stretched in the machine or longitudinal direction. This is usually accomplished through the use of rollers or godets 20, 24 set at different rotational speeds to provide a desired draw ratio. A draw oven 22 for heating of the slit film tape to facilitate this drawing step may be provided. For slit film tapes, draw ratios are usually from about 3:1 to about 10:1, with from about 5:1 to about 7:1 being more typical. Drawing of the slit film tapes orients the polymer molecules and increases the tensile strength of the tapes. The final thickness of the drawn tapes is typically from 0.5 mils to 5 mils, with from 1 to 3 mils being more typical. The width of the drawn tapes is typically from about 0.025 inches to about 0.70 inches, with from about 0.05 inches to about 0.4 inches being more typical.

After the tapes are drawn, they may be annealed in an annealing oven or on annealing godets (not shown). Annealing can reduce internal stresses caused by drawing or stretching of the tape and can act to reduce tape shrinkage. The tapes can then wound onto bobbins.

Tapes may be individually extruded as well in a direct extrusion process. In such a process, instead of slitting a plurality of tapes from a film, a plurality of individual tapes can be extruded through multiple die openings.

The polypropylene tapes produced in accordance with the present invention can exhibit, on balance, overall improved physical properties in comparison to tapes or slit films, for example, prepared from conventional and prior art propylene homopolymers and blends. Those tapes and films prepared with blends of ICP and HCPP can exhibit a greater tenacity, toughness, better elongation, and reduced shrinkage with at least one of these properties being better than the prior art. For example, the slit films of the present invention can be used in carpet applications. In this application, shrinkage can be very important. The low shrinkage of the present invention and the dimensional stability resulting therefrom can provide a competitive advantage, especially when the tenacity and toughness of the inventive slit films and tapes are the better, the same or nearly the same as those of the prior art.

One of the primary uses of slit film tapes is in carpet manufacturing. The slit film tapes can be used in both primary and secondary carpet backing for carpet construction. In a typical carpet construction, the slit film tapes are used to form a primary backing material in which the slit film tapes are woven together. Face carpet fibers or yarn are then tufted through this primary backing material. A secondary layer of backing material is also formed from slit film tapes, which may be interlaced or combined with other fibers. The secondary layer of backing material is positioned against the undersurface of the primary backing opposite the face fibers and is usually joined thereto by a layer of adhesive sandwiched therebetween.

[The slit film tapes can be formed, such as by weaving, twisting, interlacing or otherwise combined, into a variety of other items, in addition to carpet backing. These include such things as industrial bags, sacks and wraps, ropes, netting and cordage, artificial grass or turf and geotextiles. The blend of polypropylene impact copolymers and propylene homopolymers can also be used for other materials where improved drawability, higher tenacity, higher elongation, and increased toughness are desired.

The polypropylene material of the invention can be used in strapping for binding or securing cargo and the like, and where high tenacity and better strength and toughness are important. Strapping is manufactured in much the same way as slit film tapes. The blended heterophasic copolymer and polypropylene homopolymer are extruded into a sheet and quenched on chill rollers, water bath or combination thereof. The sheet is then slit longitudinally into segments or lengths of strapping and drawn in the longitudinal or machine direction. The draw ratios used are similar to those used for slit film tape. The strapping material may also be flame or otherwise surface treated. Strapping is thicker than the slit film tape and typically has a thickness of from about 3 mils to about 12 mils, with from about 5 to about 10 mils being more typical, and may have a width of from about 0.25 inches to about 1 inch.

The polypropylene material of the invention can also be formed into in mono-oriented or tensilized film. Such films are formed by extruding or casting a sheet or film and quenching the film or sheet on a chill roller, water bath or combination thereof. The sheet or film is then drawn or stretched in the longitudinal or machine direction on one or more rollers, which may be heated. Such oriented films usually are drawn at draw ratios and have thicknesses similar to the slit film tapes previously discussed. The tensilized film may be surface treated, coated with adhesives and/or release agents. The film can then be slit longitudinally into more usable widths or segments. Such materials may include tape used in packaging or box sealing tapes and similar materials.

Because of the heterophasic copolymer component, the tapes and materials formed also can exhibit increased adhesion for certain substrates that are applied thereon. This is in contrast to those materials prepared from polypropylene homopolymers. The inclusion of the heterophasic copolymer tends to disrupt the surface morphology of the material to provide better adherence when inks, adhesives, etc. are applied thereon. This allows a reduction or even elimination of various additives, such as maleic anhydride, or other treatments that are often used to increase surface adhesion of such materials.

Slit film tapes and other similar materials prepared from a blend of polypropylene impact copolymers and propylene homopolymers exhibit better drawability, higher tenacity, higher elongation, and better toughness. These properties are useful in producing durable products from and enhance the processability of the materials and the manufacturing of articles and items made from such materials. Lighter weight or down gauged fabrics or other materials can also be produced from the polypropylene materials of the invention while still maintaining strength, durability and toughness.

The slit film tapes can be used in a variety of products that require a high degree of durability and toughness. The slit film tapes can be woven or otherwise intertwined or interlaced together or with other natural or man-made fibers to form a variety of different woven materials, fabrics and other textiles.

EXAMPLE

The following examples are set forth to illustrate the invention and should not be construed as being limitative thereof. Those skilled in the art will understand that alterations and modifications, including but not limited to selection of polymers, preparation methods, amounts, and the like, which may be generally but not explicitly described or defined herein, may be made without departing from the scope of the invention.

Example 1

Polypropylene resins prepared using Ziegler-Natta catalysts are used in the evaluations. Specifically, TOTAL POLYPROPYLENE 3270 is used as the high crystallinity polypropylene, and has a xylenes solubles content of 1.0 percent. TOTAL POLYPROPYLENE 4320 is used as the impact copolymer. TOTAL POLYPROPYLENE 3365, a semicrystalline polypropylene; and TOTAL POLYPROPYLENE 3276, a high xylene soluble content HCPP having about 4 percent xylenes solubles, are used as comparative examples. Slit film tapes are prepared using the polymer components neat and as 50:50 weight blends using a Bouligny slit film tape line. The typical process parameters are set fourth in Table 1. The slit film tapes are tested for draw ratio, tensile properties, tenacity, toughness and shrinkage and the results are set forth in Table 2.

Tenacity, elongation, tensile moduli and toughness of the slit film tapes are measured using an INSTRON Model 1122 retrofitted to a model 5500 in a constant rate tensile loading mode using 50 lb (load cell and pneumatic clamping cord and yarn grips. The gauge length is set at 5 inches/minute. Tape tension is measured using a hand held tensiometer.

n determining xylene solubles, polymer samples were dissolved in boiling xylene and allowed to crystallize at room temperature for 30 min followed by a 10 min quench in an ice bath. The polymer solids were filtered and the filtrate was flashed and the residual component was dried in a vacuum oven at 70° C. for 1 hr. The xylene soluble fraction is defined as a ratio of the soluble weight fraction to the initial sample weight.

TABLE 1

Tape Line Settings

| | |
|---|---|
| Denier | 1000 |
| Barrel profile (F.) | 390-482 |
| Die (F.) | 482 |
| Die Gap (mil) | 15 |
| Air Gap (in) | 1 |
| Water Bath (F.) | 80 |
| Take Away Speed (fpm) | 100 |
| RS1A, RS1B (fpm)/(F.) | 110/ambient |
| Oven (F.) | 390 |
| Draw Ratio | 5, 6, 6.6, 7.5, 8, 8.5 |
| Annealing (F.) | 320 |
| Relaxation (%) | 15 |

TABLE 2

Comparison of Blends and Neat Polymers

| Polymer | Draw Ratio | Elong@max (%) | 5% Modulus (g/den) | Ten@max (g/den) | Shrinkage (%) | Toughness (in-lbf) |
|---|---|---|---|---|---|---|
| ICP:3270 (50:50) | 5.5 | 35.1 | 25.3 | 6 | 2.9 | 15.5 |
| | 6 | 32 | 28.8 | 6.5 | 2.9 | 14.9 |
| | 6.6 | 28.6 | 32.7 | 6.9 | 3.1 | 13.9 |
| | 7 | 25.8 | 36.7 | 7.3 | 2.8 | 12.7 |
| ICP:3365 (50:50) | 5 | 42.9 | 18.5 | 4.7 | 2.8 | 14.9 |
| | 6.6 | 29.5 | 30.9 | 6.5 | 4 | 13.1 |
| | 7.5 | 27.2 | 37.3 | 7.4 | 4.1 | 13 |
| | 8 | 24.2 | 38.6 | 7.3 | 3.8 | 11.5 |
| | 8.5 | 18.3 | 43.6 | 6.7 | 3.4 | 8.4 |
| 3365 | 5 | 42.9 | 22.1 | 5.7 | 2.4 | 18.1 |
| | 6.6 | 22.7 | 35.2 | 6.5 | 3.9 | 9.9 |
| | 7.5 | 13.1 | 41.5 | 5.1 | 3.7 | 4.2 |
| 3270 | 5.5 | 31.8 | 31.3 | 7.2 | 1.5 | 16.2 |
| | 6 | 25.1 | 35.2 | 7.2 | 1.7 | 12.2 |
| | 6.6 | 22.2 | 40 | 7.5 | 1.6 | 10.3 |
| 3276 | 5.5 | 33.2 | 27.6 | 6.7 | 5.1 | 16 |
| | 6 | 31.7 | 31.5 | 7.4 | 5.7 | 16.2 |

Figure 2:
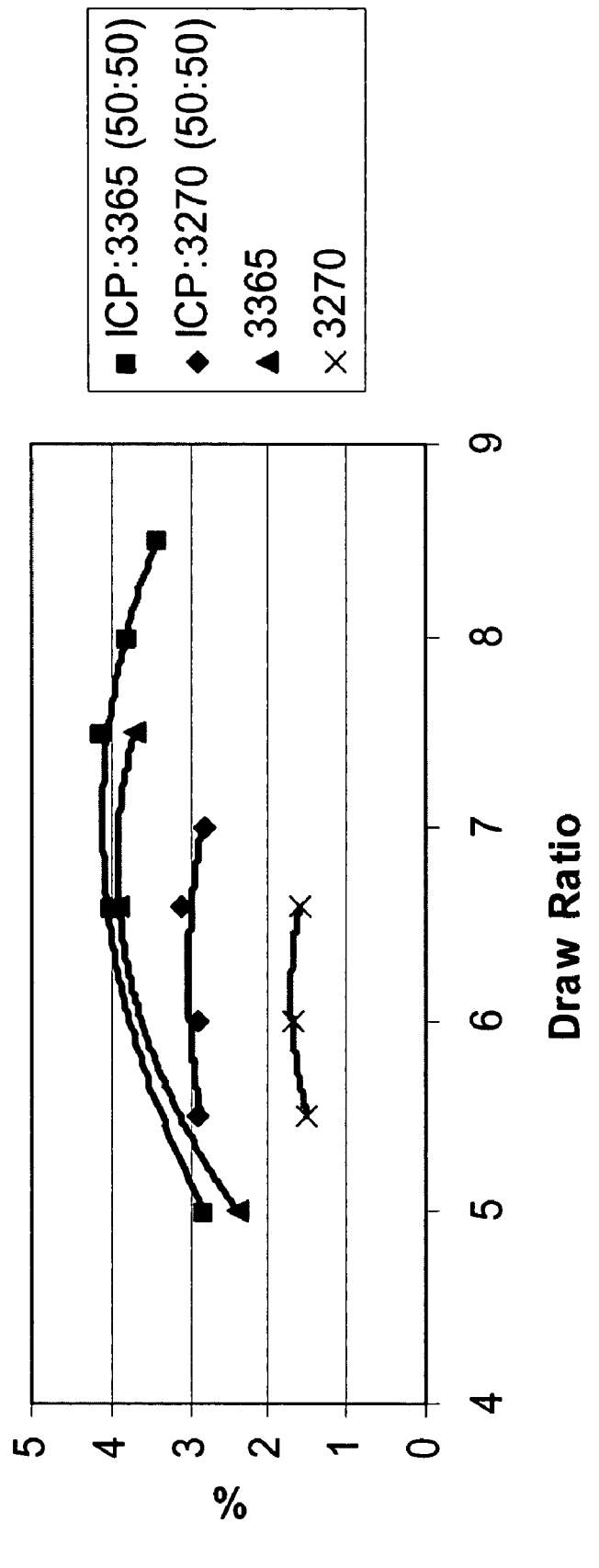
FIG. 2 is a graphic representation of the comparison of shrinkage data for the examples.
Figure 3:
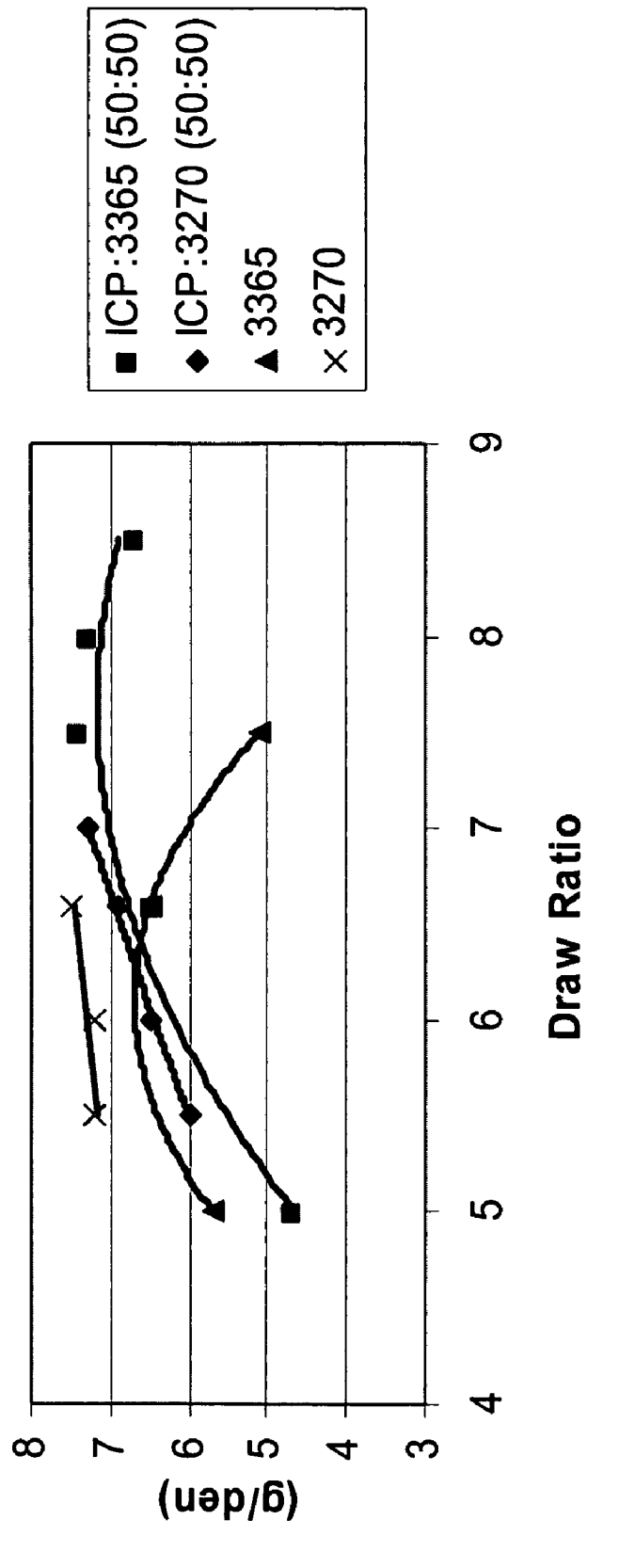
FIG. 3 is a graphic representation of the comparison of tenacity data for the examples.
Figure 4:
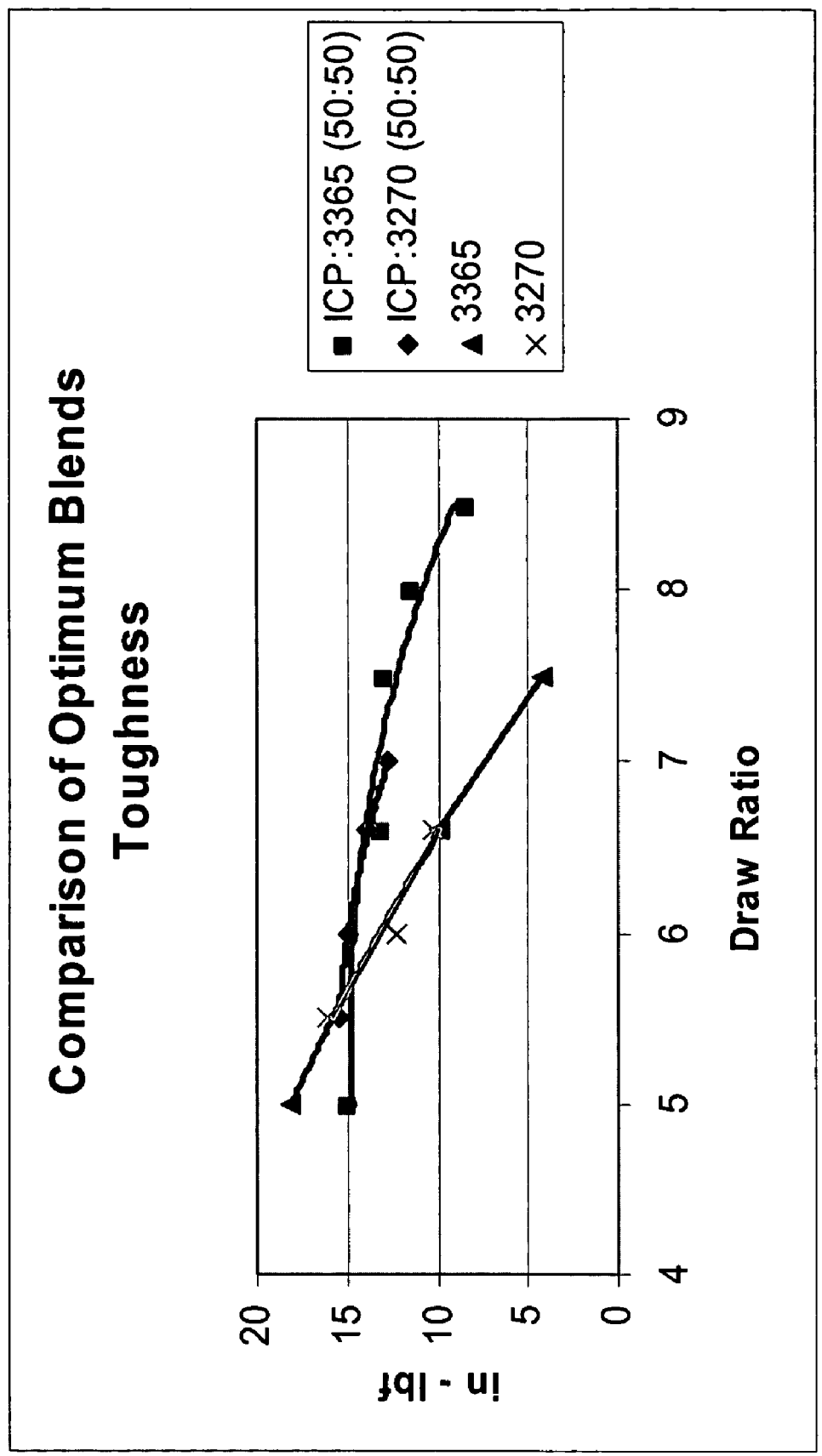
FIG. 4 is a graphic representation of the comparison of toughness data for the examples.
Figure 5:
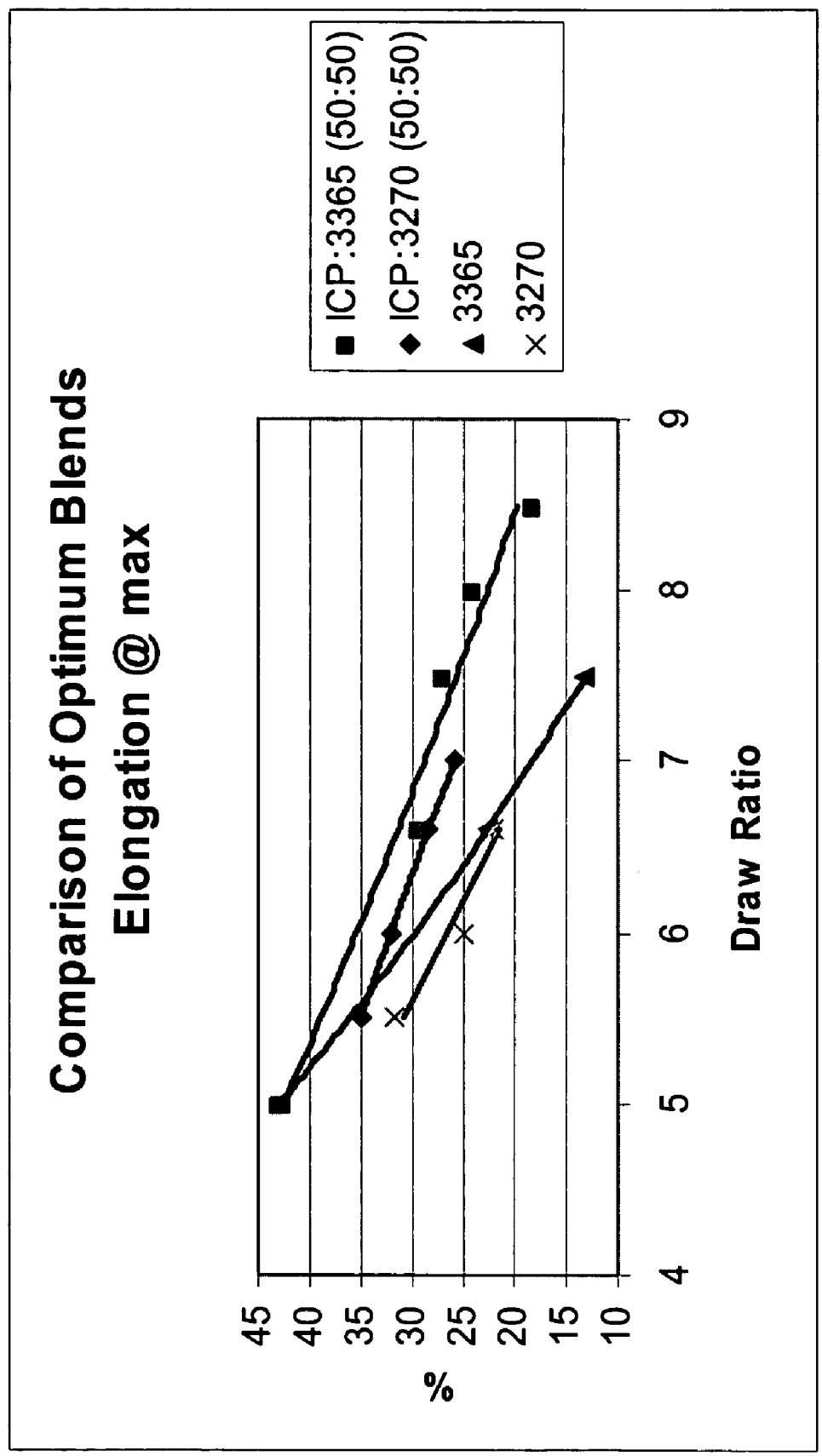
FIG. 5 is a graphic representation of the comparison of elongation data for the examples.

The examples show that the IPC:HCPP (ICP:3270) blend has the best balances of properties, especially for applications such as carpet applications. In FIG. 2, the shrinkage results are shown. As can be clearly, seen, the invention blend of IPC:HCPP has a lower shrinkage than all of the comparatives except for the neat HCPP. In FIG. 3, it is shown that the invention blend of IPC:HCPP has a higher tenacity than all of the comparatives except for the neat HCPP. In FIG. 4, it is shown that the invention blend has a much higher toughness value than the neat HCPP. In FIG. 5 is can be seen that the invention blend has a better elongation than any of the comparatives except for the semicrystalline blend. On balance the invention blend of ICP:HCPP is clearly superior to the comparatives for applications such as carpets.

We claim:

1. A polypropylene tape comprising a melt blended polypropylene impact copolymer and high crystallinity polypropylene having less than about 2 percent xylenes solubles being present in an amount of less than 80 percent by total weight of polymer blend and having an ethylene-propylene rubber phase in an amount of from about 5 percent or more by weight of copolymer.

2. An article comprising a material formed from a melt blend of a polypropylene impact copolymer and high crystallinity polypropylene having a xylene solubles content of less than about 2 percent.

3. The article of claim 1, wherein the article is selected from a group consisting of carpet backing, a bag, a sack, wrapping, rope, cordage, artificial grass or turf, a geotextile material, netting, a layer of fabric, an industrial packaging fabric, tape, strapping, packaging tape, and box sealing tape.

4. The article of claim 2 wherein the article is a carpet backing.

5. The article of claim 4 wherein the carpet backing has improved dimensional stability as compared to a conventional carpet backing.

6. A polypropylene article comprising a plurality of polypropylene slit film tapes that are interlaced or woven together and wherein the slit film tapes are each formed from a blend of a heterophasic propylene copolymer and a high crystallinity propylene homopolymer.

7. The polypropylene article of claim 6 wherein the article is a textile material.

* * * * *